(12) United States Patent  (10) Patent No.: US 7,327,649 B2
Ohmi  (45) Date of Patent: Feb. 5, 2008

(54) METHOD FOR FORMATTING OPTICAL INFORMATION RECORDING MEDIUM, AT RECORDING POWER LESS THAN RECORDING POWER TO BE USED FOR RECORDING, AND RECORDING MEDIUM FORMATTED BY THE METHOD

(75) Inventor: Fumiya Ohmi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 10/660,987

(22) Filed: Sep. 12, 2003

(65) Prior Publication Data

US 2004/0047257 A1    Mar. 11, 2004

Related U.S. Application Data

(62) Division of application No. 09/589,792, filed on Jun. 8, 2000, now abandoned.

(30) Foreign Application Priority Data

Jun. 11, 1999  (JP) ................. 11-165455

(51) Int. Cl.
  *G11B 7/125* (2006.01)
  *G11B 7/00* (2006.01)
(52) U.S. Cl. ................. 369/47.53; 369/53.27
(58) Field of Classification Search ............. 369/53.26, 369/53.27, 47.53; *G11B 7/125*
  See application file for complete search history.

(56) References Cited

U.S. PATENT DOCUMENTS

| | | | |
|---|---|---|---|
| 5,050,156 A * | 9/1991 | Barton | 369/116 |
| 5,185,733 A * | 2/1993 | Finkelstein et al. | 369/47.52 |
| 5,341,360 A * | 8/1994 | Johann et al. | 369/47.53 |
| 5,592,463 A * | 1/1997 | Muramatsu et al. | 369/47.53 |
| 5,608,710 A | 3/1997 | Minemura et al. | |
| 5,841,747 A * | 11/1998 | Kubota et al. | 369/47.52 |
| 5,974,025 A | 10/1999 | Yamada et al. | |
| 6,269,062 B1 | 7/2001 | Minemura et al. | |
| 6,320,832 B1 * | 11/2001 | Nakao et al. | 369/47.53 |

(Continued)

FOREIGN PATENT DOCUMENTS

JP    6-36474    2/1994

(Continued)

OTHER PUBLICATIONS

MAT (machine assisted translation) of JP 8-77633.*

*Primary Examiner*—Aristotelis M. Psitos
(74) *Attorney, Agent, or Firm*—Cooper & Dunham LLP

(57) ABSTRACT

A method for formatting a phase-change optical disk, using an apparatus for formatting phase-change optical disk, which apparatus includes (a) a drive control substrate on which a CPU for controlling an optical disk drive, a ROM for storing data, and an interface are mounted, and (b) an optical disk drive, is provided, and the method is carried out conducting power calibration a plurality of times to obtain a plurality of recording powers corresponding to the number of the power calibrations conducted, calculating an average recording power from the plurality of recording powers, multiplying the average recording power by a predetermined coefficient to obtain a recording power for formatting, and formatting a phase-change optical disk in accordance with the recording power for formatting. The phase-change optical disk formatted by this method is also provided.

4 Claims, 1 Drawing Sheet

U.S. PATENT DOCUMENTS 6,373,802 B1    4/2002    Hattori et al.

FOREIGN PATENT DOCUMENTS

| JP | 8-7343 | 1/1996 |
| JP | 8-77633 | * 3/1996 |
| JP | 10-69026 | 3/1998 |
| JP | 10-320777 | 12/1998 |
| JP | 11-45440 | 2/1999 |

* cited by examiner

METHOD FOR FORMATTING OPTICAL INFORMATION RECORDING MEDIUM, AT RECORDING POWER LESS THAN RECORDING POWER TO BE USED FOR RECORDING, AND RECORDING MEDIUM FORMATTED BY THE METHOD

CROSS REFERENCE TO RELATED APPLICATION

This application is a division of U.S. patent application Ser. No. 09/589,792 filed Jun. 8, 2000, now abandoned.

BACKGROUND OF THE INVENTION

1. Field of the Invention

The present invention relates to a method of formatting a phase-change optical disk and a phase-change optical disk formatted by the method.

2. Discussion of Background

It is easy to mass-produce formatted magneto-optical disks since a magneto-optical disk drive for the magneto-optical disks is such constructed that a defective sector in each disk is identified by the drive in the course of formatting the disk, and is registered in a primary defect list, called PDL, on the disk, and the defective sector is subjected to defect management.

However, in the case of a phase-change optical disk drive, the drive itself is not constructed in such a way that the defective sector in each disk is identified in the course of formatting thereof and subjected to defect management, but is constructed in such a way that the defect management is conducted when errors such as a recovered error, a read error and a write error are caused in the application for driving the phase-change optical disk, so that it is more difficult to mass-produce formatted phase-change optical disks than formatted magneto-optical disks. Furthermore, with respect to the phase-change optical disks, the process of subjecting the above errors to defect management, which is an only method that can be adopted, the conditions therefor, and the specific method for conducting the defect management entirely depend upon the application, so that it is difficult to mass-produce formatted phase-change optical recording media corresponding to a plurality of applications.

Furthermore, the thus formatted disks are not always subjected to recording or reproduction, using a drive produced by the same manufacturer as that of the formatted disks, so that when a disk formatted by a drive with a higher recording power is subjected to overwriting by another drive with a lower recording power, the recording quality of the disk is impaired due to the effects of imperfect erasing thereof and other effects, and a problem may occur that recorded data cannot be reproduced. Furthermore, another problem may occur that recorded signal or jitter is not stabilized before recording is conducted a plurality of times.

SUMMARY OF THE INVENTION

It is therefore a first object of the present invention to provide a method capable of formatting a large number of phase-change optical disks and supplying the same.

A second object of the present invention is to provide a phase-change optical disk formatted by the above method.

The first object of the present invention can be achieved by a method for formatting a phase-change optical disk, using an apparatus for formatting phase-change optical disk, which apparatus comprises (a) a drive control substrate on which a CPU for controlling an optical disk drive, a ROM for storing data, and an interface are mounted, and (b) an optical disk drive, comprising the steps of:

conducting power calibration a plurality of times to obtain a plurality of recording powers corresponding to the number of the power calibrations conducted, calculating an average recording power from the plurality of recording powers obtained, multiplying the average recording power by a predetermined coefficient to obtain a recording power for formatting, and formatting a phase-change optical disk in accordance with the recording power for formatting.

In the above method of the present invention, the average recording power may be calculated, with the elimination of at least one of a maximum recording power or a minimum recording power from the plurality of recording powers.

In the above method of the present invention, the predetermined coefficient may be 1 or less.

The above method of the present invention may further comprise a step of recording file structure data and UDF data in an identical address at least two times.

The second object of the present invention can be achieved by a phase-change optical disk formatted by the above-mentioned formatting method.

DESCRIPTION OF THE PREFERRED EMBODIMENTS

Figure 1:
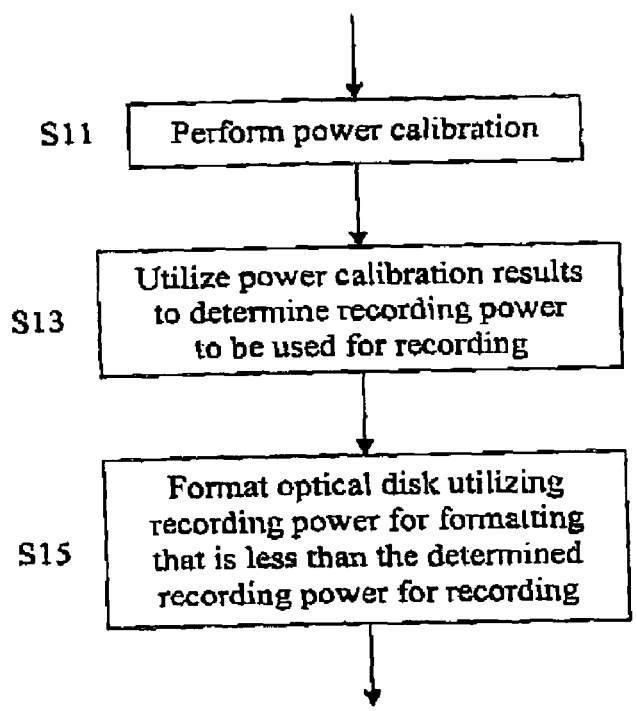
FIG. 1 shows a flow chart for a method for formatting a phase-change optical disk according to an example of this disclosure.
Figure 2:
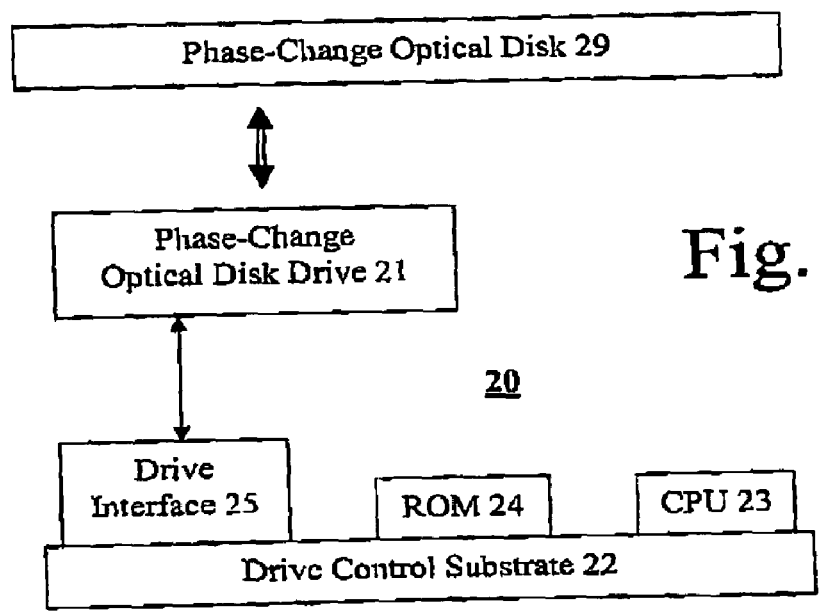
FIG. 2 is a highly simplified and diagrammatic view of an example of apparatus for formatting a phase-change optical disk for use in the present invention.

In the method for formatting a phase-change optical disk according to the present invention, there is employed an apparatus for formatting phase-change optical disk, comprising (a) a drive control substrate on which a CPU for controlling an optical disk drive or other disk drive, a ROM for storing data such as flash ROM (flash memory), and an interface such as ATAPI or SCSI are mounted, and (b) an optical disk drive, and die method comprises the steps of conducting power calibration a plurality of times to obtain a plurality of recording powers corresponding to the number of the power calibrations conducted (step S11). calculating an average recording power (step S13) from the plurality of recording powers obtained, multiplying the average recording power by a predetermined coefficient to obtain a recording power for formatting, and formatting a phase-change optical disk in accordance with the recording power for formatting (step S15).

According to the present invention, the recording power at the time of formatting can be set so as to be lower than the power with which the drive records, and important data such as file structure data and UDF data are recorded a plurality of times to compare such data with an original data, whereby the reliability of recording signals can be improved and accordingly a large number of high quality phase-change optical disks can be produced and supplied. The term "UDF" is an abbreviation of Universal Disk Format, which is a standard set up by OSTA (Optical Storage Technology Association). At present, UDF 2.0 is the latest Version, which is a standard reference concerning a logical format of disk, and others. The method of formatting for use in the present invention is called "Packet Writing" which is a process required in the first place when data is subjected to "write & read" operation at random in the phase-change optical disk. Currently, as the application software capable of performing the "Packet Writing" in the phase-change optical disk, two kinds of software are known, DirectCD (made by Adaptec) and PacketCD (made by CeQuadrat) by which, for instance, the data set up in UDF at the time of formatting, and the file structure data are recorded at a predetermined address.

Other features of this invention will become apparent in the course of the following description of exemplary embodiments, which are given for illustration of the invention and are not intended to be limiting thereof.

An example of an apparatus 20 for formatting a phase-change optical disk 29 for use in the present invention will now be explained.

The apparatus 20 comprises a phase-change optical disk drive 21, and a drive control substrate 22 on which a CPU 23 for controlling the phase-change optical disk drive, a ROM 24 for storing data, such as a flash ROM (flash memory) for storing information peculiar to the application, such as UDF data and file structure data, and a format program for carrying our the application, and a drive interface 25 such as ATAPI or SCSI are mounted.

The information such as UDF data and file structure data is reproduced, for instance, from a disk in which the information is recorded, and stored in the flash ROM, and the data of the information is recorded at a predetermined address, whereby the information can be recorded or copied in another disk. GoNo judgement of the formatted media can be made by receiving an error code from the drive through the interface thereof, based on the error information such as a recovered error, a read error, and a write error, which is returned from the drive at the time of recording and reproduction.

Generally, the power calibration of the phase-change optical disk in the phase-change optical disk drive is carried out in accordance with an "Optimum Power Control Procedure" prescribed in "Compact Disc Rewritable Part III".

In this example, the recording power of the disk is also determined in accordance with the above-mentioned "Optimum Power Control Procedure" prescribed in the "Compact Disc Rewritable Part III".

The recording power, which is affected by the dispersion of the sensitivity of the media, or by the error factors of the drive and other factors, has a dispersion of about ±5%. Therefore, when a disk is formatted with a recording power of +5% by a drive and recording is then conducted in the disk with a recording power of −5% by another drive, data recorded at the time of the formatting remains without being completely erased. Such incompletely erased data has adverse effects on the data recorded in the succeeding overwriting, and in the worst case, the reproduction of the data could become impossible. Therefore, power calibration is carried out a plurality of times and an average value thereof is determined, whereby the dispersion of the sensitivity of the media and the error factors of the drive can be reduced. Furthermore, it is more preferable that the average recording power be determined with the elimination of at least one of a maximum value or a minimum value of the recording power determined after the power calibration is conducted a plurality of times.

The average recording power is multiplied by a coefficient of 1 or less to obtain a recording power for formatting. The thus obtained recording power is set in the drive, and the formatting is conducted with the recording power, whereby the effects of the errors in determining the recording power between different drives can be eliminated and reliable data recording can be carried out.

Furthermore, with respect to a problem which is peculiar to the phase-change optical disk that recording signal or jitter is difficult to stabilize before recording is carried out a plurality of times, in the present invention, the recording signal or the jitter can be stabilized by writing important data such as file structure data and UDF data a plurality of times. By comparing the recorded data with the original data to confirm the identification thereof, a further more reliable formatted phase-change optical disk can be supplied. Japanese Patent Application No. 11-165455 filed Jun. 11, 1999, is hereby incorporated by reference.

What is claimed is:

1. A method for formatting an optical information recording medium, comprising the steps of:
  performing a power calibration by a drive,
  determining a first recording power to be used for recording data, utilizing a result of the power calibration, and
  setting a second recording power for formatting which is equal to or lower than the first recording power for recording data determined as the result of the power calibration, and
  formatting the medium by said drive at said second recording power for formatting which is equal to or lower than the first recording power for recording data.

2. An optical information recording medium formatted by the method of claim 1.

3. A method far formatting an optical information recording medium, said method comprising the steps of:
  performing a power calibration of the medium by a drive;
  determining a first recording power to be used by said drive for recording data on the medium, based on a result of the power calibration;
  determining a second recording power for formatting, by multiplying the first recording power by a coefficient of 1 or less; and
  formatting the medium by said drive in accordance with said second recording power for formatting.

4. An optical information recording medium formatted by the method of claim 3.

* * * * *